US007170740B1

(12) United States Patent
Liu et al.

(10) Patent No.: US 7,170,740 B1
(45) Date of Patent: Jan. 30, 2007

(54) FOLDABLE SUPPORT STRUCTURE

(75) Inventors: Jen-Hao Liu, Taipei (TW); San-Yang Lo, Taipei (TW); Hong-Wen Lee, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 11/307,005

(22) Filed: Jan. 19, 2006

(51) Int. Cl.
*H05K 7/20* (2006.01)

(52) U.S. Cl. .................. 361/680; 361/758; 361/770
(58) Field of Classification Search ................ 361/680
See application file for complete search history.

(56) References Cited

U.S. PATENT DOCUMENTS

| 5,734,550 | A | * | 3/1998 | Penniman et al. | .......... 361/687 |
| 5,966,284 | A | * | 10/1999 | Youn et al. | .................. 361/680 |
| 6,233,140 | B1 | * | 5/2001 | Cummings et al. | ......... 361/683 |
| 6,275,374 | B1 | * | 8/2001 | Shin et al. | ................... 361/680 |
| 6,307,736 | B1 | * | 10/2001 | Song et al. | .................. 361/680 |
| 6,595,786 | B2 | * | 7/2003 | Horiuchi et al. | .............. 439/74 |

* cited by examiner

*Primary Examiner*—Lynn Feild
*Assistant Examiner*—Anthony Q. Edwards
(74) *Attorney, Agent, or Firm*—Jianq Chyun IP Office

(57) ABSTRACT

A foldable support structure suitable for a notebook is provided. The notebook includes a keyboard, a circuit board, and a support frame, disposed above the circuit board for carrying the edge of the keyboard. The support structure is disposed inside an opening of the support frame for supporting the bottom of the keyboard. The support structure and the support frame are fabricated as a whole. The support structure includes a flexibility section, a support section and a pedestal section. The flexibility section is connected to the support frame and the support section. The pedestal section is connected to the support section. The deformed flexibility section keeps the support section away from the circuit board. The support section has a support surface for supporting the keyboard. The pedestal section is suitable for connecting the circuit board such that a distance is kept between the support section and the circuit board.

5 Claims, 4 Drawing Sheets

FOLDABLE SUPPORT STRUCTURE

CROSS-REFERENCE TO RELATED APPLICATION

This application claims the priority benefit of Taiwan application serial no. 94215218, filed on Sep. 5, 2005. All disclosure of the Taiwan application is incorporated herein by reference.

BACKGROUND OF THE INVENTION

1. Field of the Invention

The present invention relates to a support structure, and more particularly, to a support structure inside a notebook for supporting the bottom of the keyboard.

2. Description of the Related Art

With the continuous improvement of technology, the notebooks (the laptop computer) are widely applied and have become indispensable devices in our daily lives. Therefore, the functionality and convenience of the notebook usually determine the efficiency of work or the entertainment effect. The notebook is usually used by the users hitting the keys of the keyboard to input the data. Since the electronic components disposed inside the notebook such as the hard drive, the CPU and other electronic adapters are disposed below the keyboard, if the user hits the keyboard too hard, the electronic components underneath the keyboard might be damaged. Accordingly, in order for the keyboard to endure the impact caused by the user hits the keyboard or by other forces, so as to prevent the keyboard from deformation, an appropriate support structure beneath the bottom of the keyboard becomes very important.

In order to prevent the electronic components inside the notebook from scratches or presses by the deformed keyboard, it had been disclosed in the conventional technology that a part of the support frame of the base cover in the notebook extends to the center part of the bottom of the keyboard, such that the force endured by the keyboard can be evenly distributed, and the keyboard would not be excessively deformed, especially the central part of the keyboard. However, in such a structure, when it is required to install/uninstall or inspect the electronic components inside the base of the notebook, some electronic components are physically blocked by the portion extending from the support frame to support the center part of the keyboard and cannot be taken out.

In addition, a mobile support frame had been disclosed in the conventional technology to replace the center part extending from the support frame to the center of the keyboard. The mobile support frame is pivoted on the support frame, and can be detached from the electronic components after it is folded. Accordingly, when the notebook is to be inspected, after folding the mobile support frame, the electronic components can be taken out for examination or parts exchange. However, the mobile support frame mentioned above is an independent part that should be fabricated separately from the support frame and then assembled on the support frame, which increases the manufacturing cost of the notebook.

SUMMARY OF THE INVENTION

Therefore, an object of the present invention is to provide a foldable support structure disposed below the keyboard of the notebook for supporting the keyboard of the notebook, and after the support structure is folded, the electronic components disposed underneath can be conveniently taken out.

In order to achieve the object mentioned above and others, a foldable support structure suitable for a notebook is provided by the present invention. The notebook includes a keyboard, a support frame and a circuit board, wherein the support frame is disposed above the circuit board for carrying the edge of the keyboard. The support structure is disposed inside an opening of the support frame for supporting the bottom of the keyboard. The support structure and the support frame are fabricated integrally as a whole. The support structure includes a flexibility section, a support section and a pedestal section. The flexibility section is connected to the support frame, and the support section is connected to the flexibility section. The pedestal section is connected to the support section. The deformed flexibility section keeps the support section far away from the circuit board under the support frame. The support section has a support surface, and the support surface is suitable for supporting the keyboard. One end of the pedestal section is suitable for connecting the circuit board such that a distance is kept between the support section and the circuit board.

In an embodiment of the present invention, the flexibility section and the pedestal section are connected to two opposite edges of the support section, respectively.

In an embodiment of the present invention, the support section is a grid type structure.

In an embodiment of the present invention, the pedestal section also has a screw hole, for a screw to be screwed the screw hole and the circuit board to lock the pedestal section and the circuit board together.

In an embodiment of the present invention, the circuit board may be a mother board.

In summary, a support section is used by the foldable support structure of the present invention to support the keyboard, and the deformed flexibility section keeps the support section far away from the circuit board under the support frame, thus the electronic components can be easily taken out. In addition, the integrated design of the support structure and the support frame in the present invention also reduces the manufacturing cost of the notebook.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION PREFERRED EMBODIMENTS

Figure 1:
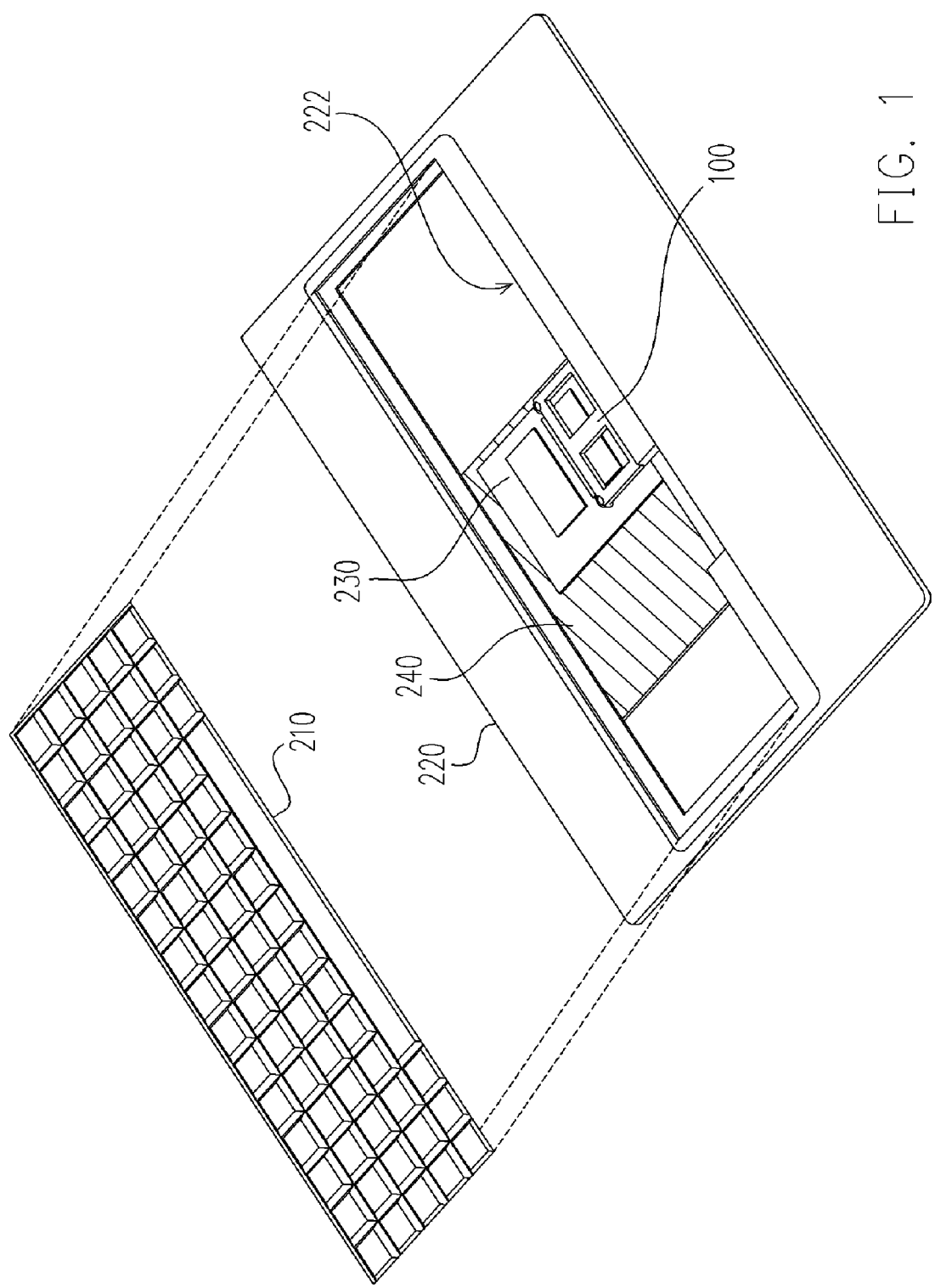
FIG. 1 is a schematic 3D diagram illustrating a folder support structure in a notebook according to an embodiment of the present invention.

FIG. 1 is a schematic 3D diagram illustrating a folder support structure in a notebook according to an embodiment of the present invention. Referring to FIG. 1, the support structure 100 of the present invention is disposed inside a notebook. The notebook comprises a keyboard 210, a support frame 220, an electronic component 130, and a circuit board 240. The support frame 220 is disposed above the electronic component 230 and the circuit board 240 for carrying the edge of the keyboard 210. The support structure 100, which is fabricated integrally with the support frame 220 as a whole, is disposed inside an opening 222 of the support frame 220 for supporting the bottom of the keyboard 210, such that the force endured by the keyboard 210 can be evenly distributed. It is to be noted that the electronic component 230 is an electronic adapter (e.g. a VGA adapter) or any electronic component inside the notebook. In addition, the electronic component 230 is installed on the circuit board 240 mentioned above. In other words, the electronic component 230 is installed on a mother board inside the notebook.

Figure 2:
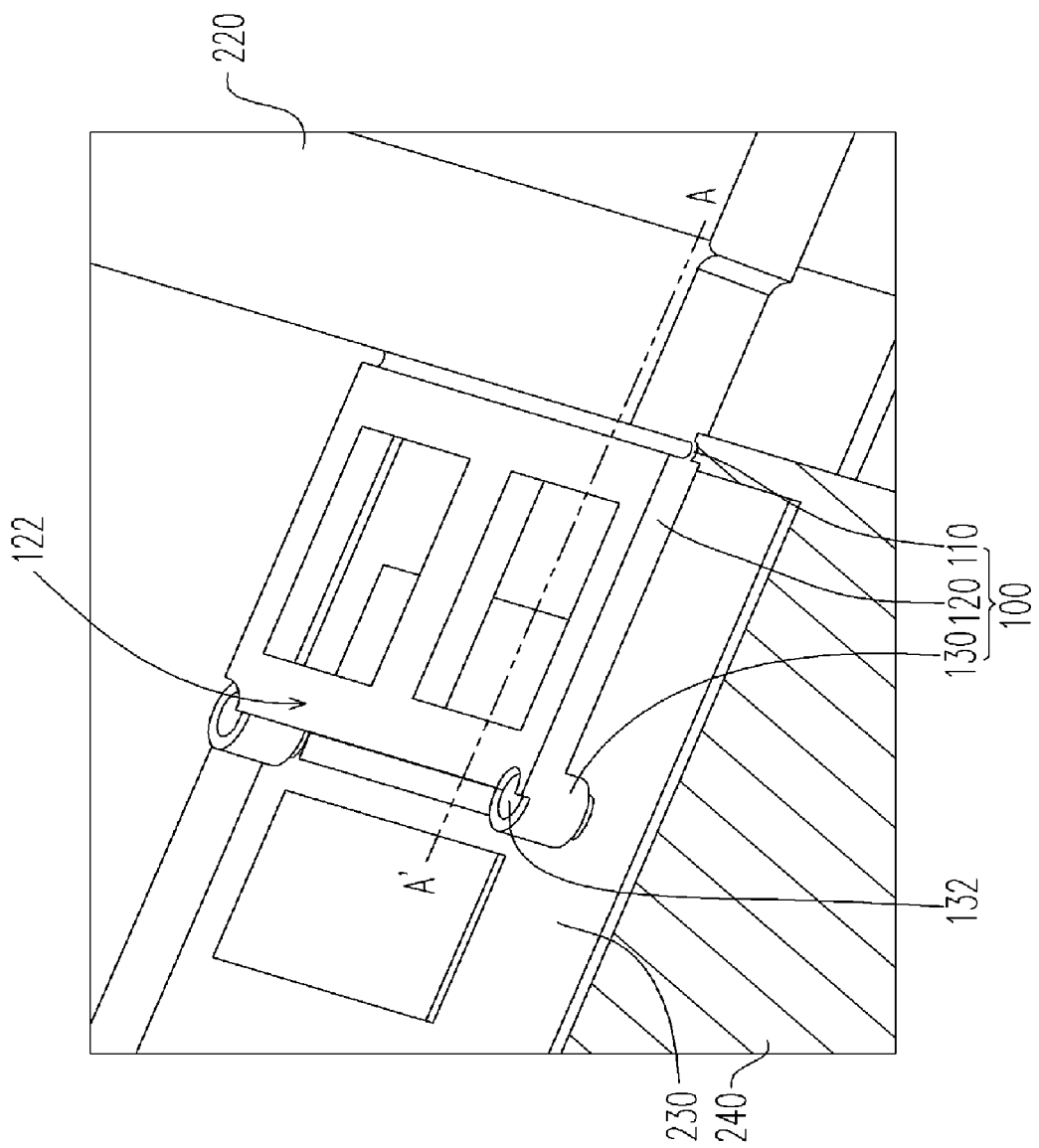
FIG. 2 is a partial enlarged diagram of FIG. 1.
Figure 3A:
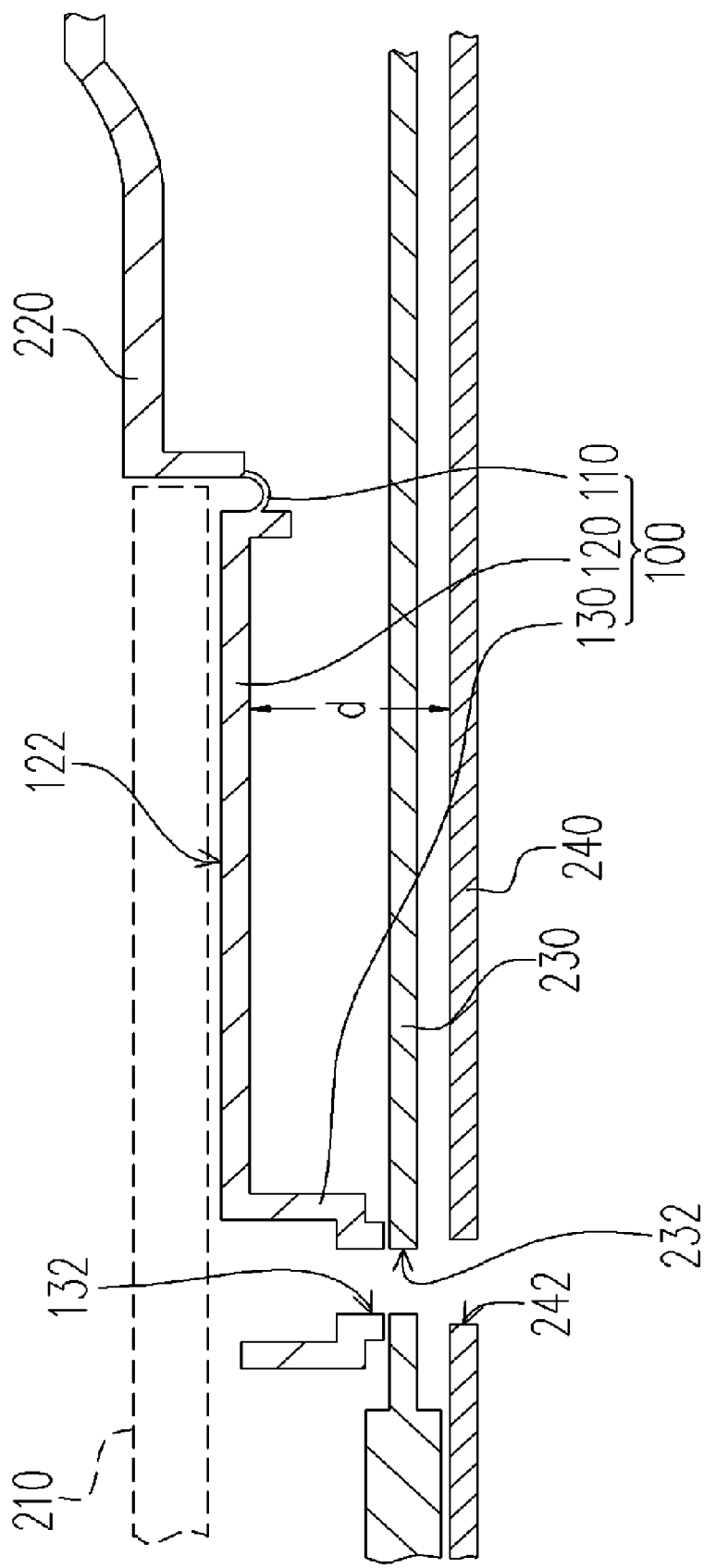
FIG. 3A is a cross-sectional view of line A–A' of FIG. 2.

FIG. 2 is a partial enlarged diagram of FIG. 1, and FIG. 3A is a cross-sectional view of line A–A' from FIG. 2. Referring to FIGS. 1, 2, and 3A, the support structure 100 comprises a flexibility section 110, a support section 120, and a pedestal section 130. The flexibility section 110 is connected to the support frame 220, the support section 120 is connected to the flexibility section 110, and the pedestal section 130 is connected to the support section 120. The flexibility section 110 may be deformed due to an external force, and the deformed flexibility section 110 keeps the support section 120 far away from the electronic component 230 and the circuit board 240 under the support frame 220. The support section 120 has a support surface 122, and the support surface 122 is suitable for supporting the keyboard 210. One end of the pedestal section 130 is suitable for connecting the circuit board 240 such that a distance d is kept between the support section 120 and the circuit board 240. Accordingly, when the support section 120 is pressed by the external force to a certain level, it may not directly scratch and damage the electronic component 230 or the circuit board 240 under the support section 120.

In the present embodiment, the flexibility section 110 and the pedestal section 130 are connected to two opposite edges of the support section 120, respectively. Here, the support section 120 may be a grid type structure to provide sufficient structural strength and save the material. However, to incorporate the layout of the components inside the notebook, in another embodiment, the flexibility section 110 and the pedestal section 130 may be connected to two neighboring edges of the support section 120, respectively. In addition, the grid structure of the support section 120 is a preferred structure for supporting the keyboard 210. However, the present invention is not limited thereto. The present invention does limit the positions of the flexibility section 110 and the pedestal section 130 corresponding to the support section 120 and the shape of the support section 120.

The pedestal section 130 further comprises at least a screw hole 132, such that a screw (not shown) can be screwed into the screw hole 132 and a hole 242 of the circuit board 240 to lock the pedestal section 130 and the circuit board 240 together. Accordingly, the relative position of the support structure 100 and the circuit board 240 are fastened to prevent the support structure 100 from shifting. In addition, the screw mentioned above can be screwed into the screw hole 132, a hole 232 of the electronic component 230, and the hole 242 to lock the pedestal section 130, the electronic component 230, and the circuit board 240, such that the relative position between the support structure 100 and the electronic component 230 is fixed, and the relative position between the support structure 100 and the circuit board 240 is fixed.

Figure 3B:
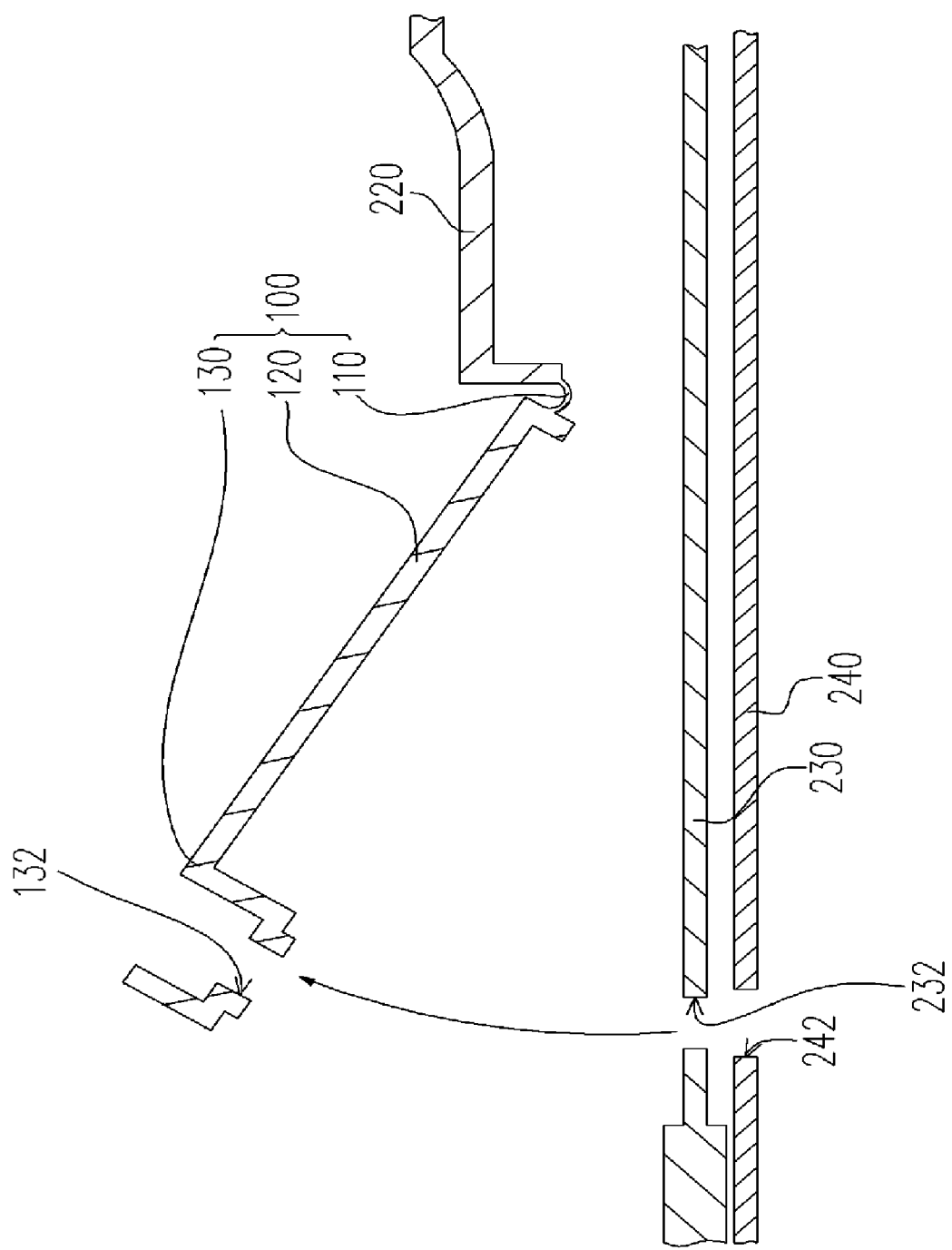
FIG. 3B is a cross-sectional view illustrating the operation of the support frame away from the circuit board in FIG. 3A.

The operation of the support structure 100 is described in greater detail with reference to FIG. 3B, a cross-sectional view illustrating the operation of the support frame away from the circuit board in FIG. 3A. Referring to FIGS. 3A and 3B, when the notebook is to be inspected, the keyboard 210 is first removed from the support frame 220. Then, after the screw is removed from the pedestal section 130, the electronic component 230, and the circuit board 240, the flexibility section 130 of the support structure 100 is deformed, and the deformed flexibility section 130 keeps the support section 120 far away from the electronic component 230 or the circuit board 240 under the support frame 220. Accordingly, the electronic component 230 or other electronic components (not shown) is detached from the possible detachable range, such that the electronic component 230 can be taken out for further examination.

In summary, a support section is used by the foldable support structure of the present invention to carry the keyboard, such that the circuit board or the electronic component under the support section is not scratched or damaged by the impact from the keyboard. In addition, the deformed flexibility section keeps the support section of the support structure far away from the possible detachable range of the electronic component after it is folded. Accordingly, the electronic components can be taken out from the notebook for further examination or parts exchange. Furthermore, since the foldable support structure and the support frame are fabricated as a whole, the manufacturing cost of the notebook is decreased.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A foldable support structure, suitable for a notebook having a keyboard, a support frame, and a circuit board, wherein the support frame is disposed above the circuit board for carrying the edge of the keyboard, the support structure is disposed inside an opening of the support frame for supporting the bottom of the keyboard, and formed integrally with the support frame as a whole, the foldable support structure comprising:
   a deformed flexibility section, connected to the support frame;
   a support section, connected to the flexibility section, wherein the support section has a support surface for supporting the keyboard, and the deformed flexibility section keeps the support section away from the circuit board under the support frame; and
   a pedestal section, connected to the support section, wherein one end of the pedestal section is suitable for connecting the circuit board, such that a distance is kept between the support section and the circuit board.

2. The support structure of claim 1, wherein the flexibility section and the pedestal section are connected to two opposite edges of the support section, respectively.

3. The support structure of claim 1, wherein the support section is a grid-type structure.

4. The support structure of claim 1, wherein the pedestal section has a screw hole, such that a screw can be screwed into the screw hole and the circuit board to lock the pedestal section and the circuit board together.

5. The support structure of claim 1, wherein the circuit board is a mother board.

* * * * *